United States Patent Office 3,017,392
Patented Jan. 16, 1962

3,017,392
POLYMERIZATION OF HIGHER LACTAMS
John M. Butler, Ross M. Hedrick, and Edward H. Mottus, Dayton, Ohio, assignors to Monsanto Chemical Company, St. Louis, Mo., a corporation of Delaware
No Drawing. Filed Aug. 5, 1957, Ser. No. 676,419
14 Claims. (Cl. 260—78)

This invention relates to the formation of linear polyamides by polymerization of lactams. More specifically, this invention relates to an improvement in the base-catalyzed polymerization of higher lactams whereby the molecular weight of the polymerization product can be reproducibly controlled at will.

In most polymerization processes (including polyamide polymerizations, and particularly base-catalyzed polymerizations of lactams) the resulting polymerization product contains a mixture of polymer species having varying molecular weights. Consequently, the so-called molecular weight of most polymers is actually an "average" molecular weight. Under many circumstances, a mixture of polymer species having a broad distribution of molecular weights is undesirable. For example, films blown from nylons of very broad molecular weight distribution will exhibit an excessive grainy appearance, whereas those blown from nylons of narrower molecular weight distribution will be relatively clear.

Another problem in the preparation of most polymers, including polyamides, is the ability to accurately and consistently produce a polymer of predetermined average molecular weight.

In our copending application Serial No. 627,984, filed December 13, 1956 (the disclosure of which is incorporated herein by reference thereto), we have described the mechanism involved in the base-catalyzed polymerization of lactams. We have also disclosed that N,N-diacyl tertiary nitrogen compounds can be utilized to provide a limited number of active sites for lactam polymerization—thereby limiting the number of polymer molecules produced during polymerization, and allowing formation of higher average molecular weight polymers than had been possible in the past.

Further investigation of the above-described polymerization system has revealed that under many circumstances the polymerization proceeds so rapidly from the artificially induced active sites that all of the sites are not utilized to the same extent—i.e., polymer molecules of extremely high molecular weights are produced from some of the sites, leaving insufficient monomer to form equally high molecular weight molecules from the remainder of the sites. This, then, gives rise to the aforementioned difficulties in reproducibly controlling the average molecular weight and molecular weight distribution in lactam polymerization.

We have now discovered a process whereby both the magnitude and distribution of molecular weight can be very precisely and reproducibly controlled in a base-catalyzed polymerization of lactams containing more than 5 carbon atoms in the lactam nucleus. This improvement is effected by carrying out the polymerization in the combined presence of (1) a tertiary-nitrogen atom-containing compound having at least two of the three N-substituents selected from the group consisting of carbonyl, thiocarbonyl, sulfonyl, nitroso, phosphinyl and thiophosphinyl radicals and (2) an effective molecular weight-regulating concentration of a primary or secondary amine. By "tertiary-nitrogen atom-containing" compounds is meant nitrogen-containing compounds wherein the nitrogen atom is trivalent and in the essential portion of such compounds at least two of the nitrogen bonds are directly attached to acyl radicals from the above-listed group and the third nitrogen bond is attached to a third such acyl radical or a carbon atom, wherein the remainder of said compounds are composed of organic radicals to satisfy the available valences, as hereinafter more fully set forth and exemplified. In the remainder of the specification, the first category of compounds will be referred to as "promoters" and the second category of compounds will be referred to as "regulators." A more detailed description of the polymerization system, the promoters, the regulators, and the conditions under which they are used is set forth below.

THE POLYMERIZATION SYSTEM

The polymerization system in which the present invention is carried out is the base-catalyzed polymerization of higher lactams—i.e., lactams having more than 5 carbon atoms in the nucleus of the lactam ring. The currently most important lactam in this category is $\epsilon$-caprolactum. However, the invention is also applicable to the higher lactams, examples of which are methyl-cyclohexanone isoximes, cycloheptanone isoxime, cyclooctanone isoxime, cyclopentadecanone isoxime, cyclic hexamethylene adipamide, etc.

In the base-catalyzed polymerization system (as distinguished, for example, from the hydrolytic polymerization system) polymerization occurs through ionization of the lactam molecule to form an iminium ion. Thus, the terminology "base-catalyzed polymerization of lactams" refers to polymerization involving the iminium ion and carried out under conditions in which said iminium ions are stable.

THE CATALYST

Suitable catalysts for the base-catalyzed polymerization of this invention are any of the metals (which can be in metallic, complex ion, or compound form) which are capable of forming acids (in the "Lewis acid" sense) sufficiently strong to form an iminium salt of the lactam being polymerized. This iminium salt is then the active catalyst of the present base-catalyzed polymerization system. Common examples of such catalysts are the alkali and alkaline earth metals (e.g., sodium, potassium, lithium, calcium, strontium, barium, magnesium, etc.), either in metallic form or in the form of hydrides, borohydrides, oxides, hydroxides, carbonates, etc. (In the case of compounds such as the hydroxides and carbonates, which give off water when reacted with lactams, the bulk of such water must be removed from the polymerization system (for example, by the application of heat and/or reduced pressures) before the base-catalyzed polymerization can take place. If such water is not removed, the required iminium ion is not stable and hydrolytic polymerization will take place rather than base-catalyzed polymerization.) Other effective catalysts are the organo-metallic derivatives of the foregoing metals as well as of other metals. Examples of such organo-metallic compounds are the lithium, potassium, and sodium alkyls such as butyl lithium, ethyl potassium or propyl sodium, or the aryl compounds of such metals such as sodium phenyl. Other suitable organo metallic compounds are diphenyl magnesium, zinc diethyl, triisopropyl aluminum, diisobutyl aluminum hydride, etc. As a general class, the materials known as Grignard reagents are effective base catalysts for the present polymerization. Typical of such Grignard catalysts are ethyl magnesium chloride, methyl magnesium bromide, phenyl magnesium bromide, and the like. Other suitable catalysts are sodium amide, magnesium amide and magnesium anilide, as well as numerous others.

The present base-catalyzed polymerization of higher lactams is generally carried out with a catalyst concentration ranging anywhere from a small fraction of one percent (e.g., 0.01%) to as much as 15 or 20 mol percent, based upon the quantity of monomer to be polymerized. In general, however, preferred catalyst concentrations will fall between about 0.1 mol percent and about 1 percent of lactam monomer.

THE PROMOTERS

The promoters used in the polymerization of the present invention are any of the general class of compounds containing as the essential active group:

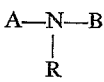

wherein N is a tertiary nitrogen atom (i.e., has no hydrogen atoms attached thereto), A is an acyl radical selected from

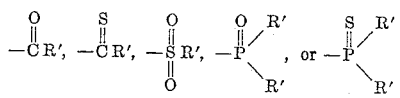

and B is an acyl radical selected from

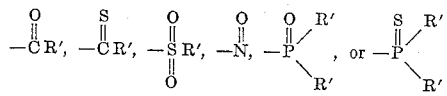

In the compounds containing the essential active group

the third group (other than A or B), designated R, attached to the nitrogen atom may be a third substituent of the same kind or general type as A or B; or a hydrocarbyl radical such as aryl, alkyl, aralkyl, alkaryl, cycloalkyl, etc.; or a heterocyclic radical such as pyridyl, quinolyl, etc.; or any of the aforementioned groups substituted with or containing additional radicals or groups such as carbonyl, N-substituted carbamyl, alkoxy, ether, sulfonyl, tertiary amino, etc.; or any other non-interfering groups (i.e., groups which will not preferentially react with the lactam or which will not otherwise interfere with the essential effective activity of the polymerization catalyst, or of the present promoters or regulators).

The substituents R' attached to the carbonyl, thiocarbonyl, sulfonyl, phosphonyl and thiophosphonyl radicals of the radicals A and B are unlimited, provided they are free of interfering groups (e.g., acidic groups which will interfere with the alkali or alkaline metal catalysts). Examples of non-interfering groups are hydrogen atoms and the hydrocarbyl and heterocyclic radicals mentioned in the preceding paragraph, including such radicals substituted with or containing polar-substituents such as tertiary amino, acylamide, N-substituted carbamido, ether, etc. The radicals A and B can be attached together to form a ring system (e.g., the cyclic imides described in greater detail below). Likewise, the radical A and the tertiary nitrogen atom can constitute a part of a ring system not including the radical B (e.g., the lactams described below).

A preferred class of materials having the aforementioned structure are N-substituted imides, i.e., compounds of the foregoing type having at least two carbonyl groups attached directly to the tertiary nitrogen atom. This group of compounds can be represented by the following structural formula:

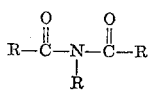

A particularly effective class of N-substituted imides are the N-carbonyl lactams such as N-acetyl-2-pyrrolidone, N-acetyl-ε-caprolyactam, N-benzoyl-ε-caprolactam, N-benzoyl-δ-valerolactam, N-ethylcarbamyl-ε-caprolactam, N-propionyl-ω-caprylolactam, N-toloyl-ω-decanolactam, etc.

Another preferred class of N-substituted imides comprise the cyclic imides of dicarboxylic acids. Examples of this class are N-phenylsuccinimide, N-phenylmaleimide, N-methylsuccinimide, N-methylphthalimide, N-acetyltetrahydrophthalimide, N-benzoylsuccinimide, N-benzoylphthalimide, etc.

Another preferred class of N-substituted imides comprise those having a multiplicity of the essential N,N-dicarbonyl tertiary nitrogen atom groups. This class includes compounds in which a portion of the group (for example, an acyl radical) is common to two or more of the essential polymerization promoting structures. Examples of this class are the N,N',N''-triphenylester of isocyanuric acid, N,N'-di(phenylcarbamyl)-N,N'-dimethylurea, ethylene disuccinimide, etc.

Examples of other N-substituted imides suitable for the above-described improved polymerization are N,N-diacetylmethylamine, N,N-dibenzoylaniline, triacetamide, N-acetyl-N-formyl ethylamine, N-propionylsaccharin, etc.

Another preferred class of effective promoters useful according to the present invention comprise the N-carbonyl sulfonamides containing no hydrogen atom on the sulfonamide nitrogen atom. Examples of this general class of materials are N-acetyl-N-ethyl-p-toluenesulfonamide, N-ethyl-N-lauroylethanesulfonamide, N,N-diacetylmethanesulfonamide, N-(phenylsulfonyl)succinimide, N-methylsaccharin, N-acetylsaccharin, N-acetyl-N-methylbenzenesulfonamide and numerous other N-carbonyl sulfonamides, including compounds of the following type,

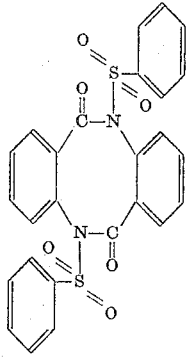

i.e. N,N'-di(phenylsulfonyl)-sym-dibenzo-6,12-diazacyclooctane-5,11-dione, such as is derived from the reaction of o-benzenesulfonamidobenzoyl chloride when heated with pyridine.

Another preferred class of suitable compounds for use according to the present invention comprises the disulfonamides such as N,N-di(p-toluenesulfonyl)anilide, N,N-di(benzenesulfonyl)methylamine, and other N,N-dibenzenesulfonyl alkylamines, as well as the corresponding N,N-dialkanesulfonylalkylamines such as N,N-di(methanesulfonyl)ethylamine, etc.

Another preferred type of effective polymerization promoting compounds comprise the N-nitrosoamides. Representative members of this class of compounds are N-nitroso-2-pyrrolidone, N-nitrososuccinimide, N,N-diacetylnitrosoamine, N-nitroso-N-acetyl-propylamine, N-nitroso-N,N'-di-n-butylurea, N-methyl-N-nitrosourethane and other N-substituted N-nitroso-carbamates, etc.

Another preferred class of promoters for the present polymerization comprises the N-nitrososulfonamides, such as N-nitroso-N-methylbenzenesulfonamide, N-nitroso-N-methyl-p-toluenesulfonamide, N-nitroso-N-ethyl methanesulfonamide, N-nitroso-N-phenethyl butanesulfonamide, etc.

Another preferred class of promoters for the present invention comprises N-acyl-N-phosphinyl tertiary nitrogen compounds, such as N-(dimethylphosphinyl)-ε-caprolactam, N,N-bis(diethylphosphinyl) methyl amine, N-[ethyl(methyl)phosphinyl]-pyrrolidone, N-(diethylphosphinyl)-N-methylacetamide, N-(diethoxyphosphinyl)-N-methyl-p-toluenesulfonamide, etc.

As was indicated above, one or more of the acyl oxygen atoms of the various compounds described herein may be replaced by sulfur atoms to form the corresponding thioacyl compounds without destroying the effectiveness of such compounds as promoters for the polymerization of the present lactams. Examples of such thio compounds are 1-acetyl-2-thiohydantoin and 3-butyl-5,5-dimethyl-2-thio-2,4-oxazolidinedione. Other suitable thio analogs of the foregoing acyl compounds are N-thiobenzoyl - 2 - pyrrolidone, N-thiopropionylmaleimide, N-phenyldithiosuccinimide, N-(n-octylcarbamyl)-2-thiopyrrolidone, N-(dimethylthiophosphinyl)-ε-caprolactam, etc.

The concentration of promoter utilized in the process of the present invention will generally run between about 0.01 and about 20 mole percent, and preferably between about 0.1 and about 1 mole percent, of lactam monomer.

Although the preceding description has been set forth in terms of addition of the present N,N-diacyl tertiary nitrogen promoters to the lactam monomer or lactam polymerization mixture, it should be recognized that these promoters can easily be formed in situ in the polymerization reaction mixture. Thus, for example, n-butylamine and phthalic anhydride can be added separately to the lactam monomer, and will react therein to form N-n-butylphthalimide, an effective promoter.

A particularly effective way to generate the present promoters in situ is to add a compound which will acylate the lactam monomer itself, to form an N-acyl lactam promoter. The principal criterion of such acylating additives is that they be ones which will acylate the lactam monomer (under the particular conditions employed) more readily than the lactam monomer molecules will acylate each other (i.e., by breaking the lactam ring and reacting with other lactam molecules to form N-(ε-aminocaproyl)-ε-caprolactam). Examples of suitable lactam-acylating agents for in situ formation of promoters useful in this invention are ketenes, isocyanates (e.g., ethyl isocyanate and p-phenylene diisocyanate), phosgene, esters (e.g., diethyl adipate, dioctyl carbonate, N-butyl palmitate and polyvinyl acetate), N-carboxyamino acid anhydrides (e.g., glycine N-carboxyanhydride and isatoic anhydride), amides (e.g., N,N-diphenylformamide and acetanilide), sulfonamides (e.g., N-methyl p-toluenesulfonanilide and N,N-diphenyl p-toluenesulfonamide), acid chlorides (e.g., acetyl chloride, benzoyl chloride and carbamyl chlorides), acid anhydrides (e.g., maleic anhydride and phthalic anhydride), urethanes (e.g., isopropyl N-phenyl carbamate, diethyl carbamate, and 2-keto-tetrahydro-1,3-oxazine), ureas (e.g., sym. diphenylurea, sym. dimethylurea and tetramethylurea), as well as numerous others.

It will be noted that in many cases the preceding-described in situ promoter formation will also involve the formation of by-products (such as hydrogen chloride, carboxylic acids, amines, water, etc.) which must be taken into account and compensated for. This may be done, for example, by removal of the by-product, utilization of additional catalyst to compensate for that which might be inactivated by the by-product, etc.

THE REGULATORS

The regulator compounds for use in conjunction with the above-described promoters according to the present invention are either primary or secondary amines—i.e., amines having at least one hydrogen atom attached to the amino nitrogen atom. Such amines can be either aliphatic or cyclic amines. The aliphatic amines can be either saturated or unsaturated and either normal chain or branched chain. The cyclic amines can be either ones in which the amino nitrogen atom is a part of the ring (i.e., N-heterocyclic amines) or ones in which the rings are merely attached to the amino nitrogen atom (i.e., as in alicyclic, heterocyclic, or aromatic substituted amines). The secondary amines can be either symmetrical (i.e., containing two identical radicals attached directly to the amino nitrogen atom) or unsymmetrical, the latter group including mixed arylalkyl amines, unsymmetrical alkyl amines, etc.

The primary amines have been found generally more suitable than the secondary amines. In order for the secondary amines to be markedly effective, they should have a basicity greater than that of N-methylaniline.

Examples of typically suitable amines which are useful as regulators are as follows: methylamine, ethylamine, n-propylamine, i-propylamine, n-butylamine, t-butylamine, n-pentylamine, t-amylamine, n-hexylamine, 2-ethylhexylamine, n-octylamine, n-decylamine, laurylamine, cetylamine, n-hexadecylamine, stearylamine, allylamine, ω-decenylamine, oleylamine, benzylamine, phenethylamine, cyclohexylamine, cyclopentylamine, cyclopentenylamine, aniline, ortho-, meta-, and para-toluidine, 2,4-, 2,5- and 3,5-xylidines, α- and β-naphthylamine, furfurylamine, thenylamine, dimethylamine, diethylamine, di-2-ethylhexylamine, diallylamine, dicyclohexylamine, ethylmethylamine, n-butyl-2-ethylhexylamine, allylmethylamine, n-butylpropenylamine, cyclohexylethylamine, piperidine, piperazine, morpholine, etc.

From the foregoing, it will be recognized that the term amine (as used with respect to the present regulators) includes imino compounds (i.e., wherein two of the three bonds attached to the nitrogen atom are attached to the same adjacent atom or group) as well as amino compounds. The term does not, however, include amido or imido nitrogen atoms (as in acetamide, caprolactam or maleimide), in which the nitrogen atoms are adjacent to an acyl radical.

It should be understood that the essential active configuration of the foregoing amine regulators is the primary or secondary amino group—and while the presence of additional radicals (polar or otherwise) other than those categories indicated above is not necessary, such additional radicals will not materially affect the operability of the amines as regulators—provided, of course, that the additional radicals or groups are not such as will preferentially react with or destroy the lactam, or otherwise interfere with the essential effective activity of the polymerization catalysts, the promoters or the regulators. Examples of substituted amines which will not interfere with the polymerization of the present invention are haloaryl amines such as p-chloroaniline, methoxyaryl amines such as anisidine, etc. Other examples of polar-substituted amino compounds which are effective regulators are the salts and esters of amino acids—for example, ethylglycinate, the methyl ester of ω-amino heptanoic acid, the sodium salt of ω-amino caproic acid, N-(β-aminoethyl)acetamide, etc. Other suitable regulators are compounds containing two or more amino and/or imino groups such as hexamethylene diamine; polyamines such as diethylenetriamine; and polyamino polyethers such as 1,2-bis(3-aminopropoxy)ethane.

It is also possible to practice the present invention by forming the required amine regulators in situ in the polymerization mixture rather than adding the amine itself to the polymerization mixture. As indicated previously, the various salts and esters of amino acids are effective regulating amines. These compounds can be readily formed from the lactam monomer in the polymerization mass merely by adding an appropriate amount of a material such as sodium hydroxide (or water which will react with base metal catalyst to form a hydroxide), which will in turn hydrolyze some of the caprolactam to form the necessary amount of the metal salt of the amino acid of the lactam monomer. The same effect can be obtained by the use of an alcohol (e.g., ethyl alcohol) to form in situ a regulating concentration of an ester of the amino acid of the lactam monomer.

The concentration of regulating amine to be used in the present invention is dependent upon the concentration of promoter utilized. In general, the preferred proportions constitute equimolar proportions of the promoter and the regulator. However, considerable deviation from equimolar proportions can be tolerated without losing the desirable effect achieved by the present invention. For example, the molar proportion of regulator to promoter can be varied from as low as about 1:4 to as high as about 2:1 or even higher, although it will generally be preferred to maintain this proportion between about 1:2, and about 3:2. In the cases of promotors or regulators which contain more than one active group (as, for example, 1,2-bis(3-aminopropoxy)ethane, the desired concentration should be determined by assuming the compound to have a molecular weight equal to the actual molecular weight divided by the number of active groups per molecule. Thus, for example, one mol of 1,2-bis(3-aminopropoxy)ethane will behave as two moles of a monoamine, so that only ½ mol of the diamine compound per mol of monofunctional promotor will be required in order to give the aforementioned preferred "equimolar" proportion.

As was pointed out in an earlier section of this specification, the in situ formation of promoters may give rise to formation (as by-products) of water, various amines, etc. Such by-products must be taken into account in selecting the optimum or desired regulator:promoter ratio discussed in the preceding paragraph.

While the sequence of addition of the various required components (i.e., monomer, catalyst, promoter and regulator) of the present invention is not particularly critical under most circumstances, there are some precautionary measures which must be observed. For example, if the particular catalyst used is one which gives off water when reacted with the lactam (as in the earlier-mentioned cases of hydroxide or carbonate catalysts), that water must be removed before addition of the present promoters or else the promoters will be rendered inactive. Stated more generally, the present promoters should not be added to the polymerization system until the system has been stabilized with respect to iminium ion. (See earlier discussion of "The Polymerization System.")

The present polymerization can be carried out by any of the conventional procedures, such as by mass polymerization, solution polymerization or suspension polymerization. Polymerization takes place readily and rapidly at temperatures as low as 100° C. It will also take place at much higher temperatures, including the conventional lactam polymerization temperatures (230–250° C.). However, at temperatures much in excess of 190° C. or 200° C., the benefits of reproducibility, control, etc. tend to be less marked. Consequently, preferred polymerization temperatures are those between about 140° C. and about 180° C. At these temperatures, the bulk of the polymerization reaction (e.g., 90% or higher conversion of monomer to polymer) is generally completed within a few minutes. However, it is often desirable to allow the mass to remain at the polymerization temperature for longer periods of time (e.g., up to several hours) in order to achieve maximum conversion (e.g., 99+%).

In order to minimize discoloration of the polymer product, it will generally be desirable to carry out the polymerization under an inert atmosphere (e.g., nitrogen), or to otherwise exclude oxygen from contact with the lactam monomer, catalyst, etc., at the higher temperatures.

*Example 1*

One mol (113 grams) of vacuum distilled ε-caprolactam was melted in a flask under an atmosphere of dry nitrogen and 1/200 of a mol (0.12 gram) of sodium hydride catalyst was dissolved therein. A mixture of 1/200 of a mol (0.71 ml.) of N-acetyl-ε-caprolactam and 1/200 of a mol (0.66 ml.) of n-hexyl amine was added to the catalyzed monomer. The temperature of the reaction mixture was raised to 160° C. and maintained at that temperature until completion of polymerization was assured (about 3½ hours). The resulting solid white polymer was cooled, ground sufficiently finely to pass through a ⅛ inch screen, leached (first with ½ percent aqueous formic acid solution and then with water) to remove residual monomer, and then dried at 105° C. The average molecular weight and molecular weight distribution of this polymer were characterized by measuring the melt index and dimensional recovery (memory) of the polymer as it was passed through an extrusion plastomer. The melt index is an indication of molecular weight and is determined by measuring the rate at which polymer is extruded through a standard orifice under a constant specified pressure and at a specified temperature. It was measured by the procedure described in ASTM specification D-1238–52T, except that a 6,885 gram weight was utilized and the polymer was maintained at 250° C. during extrusion. The "memory" is defined as the percent increase in diameter of extruded polymer over the diameter of the orifice through which it is extruded. (A polymer with a broad molecular weight distribution will have a high memory, whereas a polymer with a very narrow molecular weight distribution will have a low memory.) The above-described polymer was found to have a melt index of 5.24 grams/minute and a memory of less than 1 percent, whereas a polymer prepared in the same way except that no n-hexyl amine regulator was utilized, had a melt index of 0.05 gram/minute and a memory of greater than 100 percent.

*Example 2*

One mol (113 grams) of distilled ε-caprolactam was melted under an atmosphere of dry nitrogen, after which 1/140 of a mol (1.0 ml.) of N-acetyl-ε-caprolactam, 1/140 (1.7 ml.) of tertiary-dodecyl amine, and 1/140 of a mol (0.17 gm.) of sodium hydride were each added to the molten caprolactam and the mixture heated at 160° C. for about 2 hours. The resulting polymer was ground and leached in the same manner as described in Example 1. The purified polymer had a melt index of 4.07 grams/minute and a memory of 18.3 percent, whereas a polymer prepared in the same manner except without the addition of tertiary-dodecyl amine had a melt index of 0.48 gram/minute and a memory of 70.7 percent.

*Example 3*

A polymer was prepared in the same manner as in Example 2, above, using 1 mol (113 grams) of ε-caprolactam, 1/800 of a mol (0.26 ml.) of bis(4-isocyanatophenyl)methane, 1/400 of a mol (0.06 gram) of sodium hydride and 1/400 of a mol (0.23 ml.) of aniline. The polymer had a melt index of 0.49 gram/minute and a memory of 19.5 percent, whereas a polymer prepared in the same manner except without the addition of aniline had a melt index of less than 0.05 and a memory of greater than 100 percent.

*Example 4*

A polymer was prepared by the same procedure described in Example 1, utilizing 1/200 of a mol of N-acetyl-ε-caprolactam, 1/400 of a mol (0.44 gm.) of 1,2-bis(3-aminopropxyl)ethane, and 1/200 of a mol (0.12 gm.) of sodium hydride. The polymer had a melt index of 1.89 grams/minute and a memory of 9.7 percent. A polymer prepared in the same manner except without the addition of 1,2-bis(3-aminopropoxy)ethane had a melt index of 0.05 gram/minute and a memory of greater than 100 percent.

*Example 5*

A polymer was prepared by the same procedure as described in Example 1, utilizing 1/200 of a mol (0.71 ml.) of N-acetyl-ε-caprolactam, 1/200 of a mol (0.84 ml.) of di-n-butylamine, and 1/200 of a mol (0.12 gram) of sodium hydride. The polymer had a melt index of 1.18 grams/minute and a memory of 52.4 percent. A polymer prepared in the same way, except that no di-n-butylamine was utilized, had a melt index of 0.05 gram/minute and a memory greater than 100 percent.

Example 6

A polymer was prepared according to the procedure described in Example 2, utilizing 1/100 of a mol (0.24 gram) of sodium hydride, 1/200 of a mol (0.71 ml.) of N-acetyl-ε-caprolactam, and 1/200 of a mol (0.09 ml.) of water—the latter for the purpose of in situ formation of ε-aminocaproic acid by hydrolysis of ε-caprolactam. The polymer had a melt index of 4.5 grams/minute and a memory of less than 1 percent. A polymer prepared in the same way, but without the addition of the water, had a melt index of 0.05 gram/minute and a memory of greater than 100 percent.

Example 7

In order to demonstrate the effect of variations in concentration of catalyst, and regulator, a series of ε-caprolactam polymers were prepared utilizing sodium hydride as a catalyst, N-acetyl-ε-caprolactam as a promoter and aniline as a regulator in the various molar proportions set forth in the following Table I. The melt index, approximate molecular weight, and memory of the resulting polymers are also set forth in that table.

TABLE I

| Sodium hydride/ ε-caprolactam | N-acetyl-ε-caprolactam/ ε-caprolactam | Aniline/ ε-caprolactam | Melt Index (gm./min.) | Molecular Wt. | Memory (percent) |
|---|---|---|---|---|---|
| 1/140 | 1/140 | 1/140 | 9.6 | ------ | <1 |
| 1/140 | 1/140 | 3/560 | 6.6 | ------ | <1 |
| 1/140 | 1/140 | 1/280 | 4.0 | ------ | 26.8 |
| 1/140 | 1/140 | 1/560 | 1.2 | ------ | 58.5 |
| 1/140 | 1/140 | none | 0.48 | ------ | 70.7 |
| 1/140 | 1/140 | 1/140 | 9.6 | 15,800 | <1 |
| 1/200 | 1/200 | 1/200 | 4.6 | 22,500 | <1 |
| 1/250 | 1/250 | 1/250 | 1.9 | 28,000 | 11 |
| 1/300 | 1/300 | 1/300 | 1.0 | 33,900 | 25 |
| 1/400 | 1/400 | 1/400 | 0.44 | 45,000 | 28 |
| 1/400 | 1/530 | 1/530 | 0.22 | 60,000 | 23 |
| 1/400 | 1/660 | 1/660 | 0.15 | 75,000 | 23 |
| 1/400 | 1/1,000 | 1/1,000 | 0.08 | 113,000 | 25 |
| 1/400 | 1/1,400 | 1/1,400 | >0.05 | 158,000 | (¹) |

¹ Polymer melt viscosity (molecular weight) too high for measurable flow.

From the foregoing table it can be seen that variation in the proportion of promoter to monomer can be used to control the molecular weight of the polymer and that the regulator can be used to reduce the memory of the polymer.

Example 8

In order to demonstrate the high degree of reproducibility and the control which can be achieved by utilizing the regulators of the present invention, eight polymer samples were prepared under comparable conditions of temperature (160° C.), catalyst concentration (sodium hydride, 1/200 of a mol), and promoter concentration (N-acetyl-ε-caprolactam, 1/200 of a mol). In the first five preparations, 1/200 of a mol of aniline was also utilized, whereas in the last three preparations no aniline or other regulator was utilized. The molecular weights of the resulting polymers were then measured by determining the specific viscosities of solutions containing 0.1 weight percent of polymer in 90 percent aqueous formic acid. The results are shown in the following Table II.

| Sample No. | Specific Viscosity | |
|---|---|---|
| | Aniline-Regulated | Unregulated |
| 1 | 0.160 | ------ |
| 2 | 0.164 | ------ |
| 3 | 0.161 | ------ |
| 4 | 0.164 | ------ |
| 5 | 0.159 | ------ |
| 6 | ------ | 0.436 |
| 7 | ------ | 0.531 |
| 8 | ------ | 0.328 |

As will be seen from Table II, the variation between minimum and maximum viscosities of aniline-regulated polymers was only 0.005. With the unregulated polymers even the smallest variation between samples was 0.095—and the variation between minimum and maximum was 0.203.

We claim:

1. In the base-catalyzed polymerization of higher lactams having more than 5 carbon atoms in the lactam ring thereof, the improvement comprising carrying out said polymerization under substantially anhydrous conditions at an initiating temperature above the melting point of the lactam and below the softening point of the polymerization product and in the presence of (1) between about 0.01 and about 20 mol percent, based on the lactam monomer, of a nitrogen-containing promoter compound in which the nitrogen atoms are trivalent and in which at least one nitrogen atom is directly attached to at least two radicals selected from the group consisting of carbonyl, thiocarbonyl, sulfonyl, nitroso, phosphinyl and thiophosphinyl radicals and no promoter compound has more than one nitroso radical directly attached to said nitrogen atom, the remaining bond of said nitrogen atom being attached to a member from the group consisting of said radicals and carbon, the remainder of said promoter compound being composed of organic radicals sufficient to satisfy the remaining available valences and no nitrogen atom in said organic radicals has more than one hydrogen atom attached directly thereto, and (2) between about 0.25 and about 2.0 mols, per mol of said nitrogen-containing promoter compound, of an amine regulator compound having at least one hydrogen atom attached to the amine nitrogen atom therein.

2. The process of claim 1, wherein the higher lactam is ε-caprolactam, the base-catalyst is sodium caprolactam, between about 0.1 and about 1 mol percent, based on the ε-caprolactam monomer, of the nitrogen-containing promoter compound is employed, and the amine regulator compound contains up to 20 carbon atoms and is present in an amount of from about 0.5 to about 1.5 mols, per mol of the nitrogen-containing promoter compound.

3. The process of claim 1, wherein the initiating polymerization temperature is from about 100° to about 230° C. and the amine regulator compound is present in an amount of from about 0.5 to about 1.5 mols, per mol of the nitrogen-containing promoter compound.

4. The process of claim 3, wherein the amine regulator compound contains up to 20 carbon atoms.

5. The process of claim 3, wherein the higher lactam is ε-caprolactam and the amine regulator compound is a primary amine.

6. The process of claim 5, wherein the amine regulator compound is a primary aromatic amine.

7. The process of claim 3, wherein the nitrogen-containing promoter compound contains two carbonyl radicals directly attached to the nitrogen atom and the remaining available valences thereof are hydrocarbon radicals.

8. The process of claim 4, wherein the base-catalyst is sodium caprolactam, the higher lactam is ε-caprolactam, the initiating polymerization temperature is from about 100° to 200° C., and between about 0.1 and about 1 mol percent, based on the ε-caprolactam monomer, of the nitrogen-containing promoter compound is employed.

9. The process of claim 8, wherein the amine regulator compound is aniline.

10. The process of claim 8, wherein the amine regulator compound is n-hexyl amine.

11. The process of claim 8, wherein the amine regulator compound is t-dodecyl amine.

12. The process of claim 8, wherein the nitrogen-containing promoter compound contains two carbonyl radicals directly attached to the nitrogen atom and the remaining available valences thereof are hydrocarbon radicals.

13. The process of claim 8, wherein the initiating polymerization temperature is from about 140° to about 180° C.

14. The process of claim 12, wherein the nitrogen-containing promoter compound is N-acetyl-ε-caprolactam and the amine regulator compound is aniline.

References Cited in the file of this patent

UNITED STATES PATENTS

| | | |
|---|---|---|
| 2,251,519 | Joyce et al. | Aug. 5, 1941 |
| 2,277,152 | Schlack | Mar. 24, 1942 |
| 2,698,845 | Mastin et al. | Jan. 4, 1955 |